(12) United States Patent
Yang et al.

(10) Patent No.: US 8,095,767 B2
(45) Date of Patent: Jan. 10, 2012

(54) ARBITRARY PRECISION FLOATING NUMBER PROCESSING

(75) Inventors: Xu Yang, Beijing (CN); Hao Wei, Beijing (CN); Gong Cheng, Beijing (CN); ZhangZhang Song, Beijing (CN); Dongmei Zhang, Redmond, WA (US); Jian Wang, Hangzhou (CN)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/346,061

(22) Filed: Dec. 30, 2008
(Under 37 CFR 1.47)

(65) Prior Publication Data

US 2010/0169605 A1 Jul. 1, 2010

(51) Int. Cl.
*G06F 12/02* (2006.01)
*G06F 7/38* (2006.01)

(52) U.S. Cl. ........ 711/171; 708/495; 711/220; 711/217; 711/E12.002; 711/E12.013

(58) Field of Classification Search .................. 711/170, 711/171, E12.002, E12.013, 220, 217, 219; 708/102, 495, 654, E12.013, 220, 217, 219
See application file for complete search history.

(56) References Cited

U.S. PATENT DOCUMENTS

| | | | |
|---|---|---|---|
| 5,619,711 A | 4/1997 | Anderson | |
| 5,652,862 A | 7/1997 | Hanson | |
| 5,893,084 A | 4/1999 | Morgan et al. | |
| 5,900,023 A * | 5/1999 | Pase | 711/220 |
| 6,842,765 B2 | 1/2005 | Enenkel et al. | |
| 7,117,237 B2 | 10/2006 | Amano et al. | |
| 7,150,018 B2 * | 12/2006 | Golds et al. | 718/102 |
| 7,237,228 B1 | 6/2007 | Wise | |
| 7,321,914 B2 | 1/2008 | Kurnik | |
| 2005/0065990 A1 * | 3/2005 | Allen | 708/495 |
| 2006/0106903 A1 | 5/2006 | Karaki | |
| 2008/0140744 A1 | 6/2008 | Shadich | |

OTHER PUBLICATIONS

Dekker, T. J., "A Floating Point Technique for Extending the Available Precision," 1971, Numerishe Mathematik vol. 18, pp. 224-242.*
Brent, R., "On the Precision Attainable with Various Floating Point Systems," IEEE Transactions on Computers, vol. C-22, 1973, pp. 601-607.*
Priest, "Algorithms for Arbitrary Precision Floating Point Arithmetic", retrieved on Oct. 1, 2008 at <<http://citeseerx.ist.psu.edu/viewdoc/download?doi=10.1.1.55.3546&rep=rep1&type=pdf>>, Mar. 19, 1991, pp. 1-25.
Rodrigues, et al., "Numerical Calculation with Arbitrary Precision", retrieved on Oct. 1, 2008 at <<http://arxiv.org/PS_cache/arxiv/pdf/0707/0707.1716v1.pdf>>, Feb. 5, 2008, pp. 1-4.

(Continued)

*Primary Examiner* — Pierre-Michel Bataille
(74) *Attorney, Agent, or Firm* — Lee & Hayes, PLLC

(57) ABSTRACT

Techniques for providing arbitrary precision floating number (APFN) processing are disclosed. In some aspects, an APFN store may be used to store a large number (i.e., an APFN) having many significant digits, which in turn may enable a high degree of precision in mathematical operations. An APFN module may be used to create and define the APFN store. The APFN module may enable a user to define a precision (significant digits) for the large number that corresponds to the size of an array of bytes in the APFN store that are allocated for storing the large number. In further aspects, the APFN store may be used to store additional intermediary data and a resultant.

20 Claims, 3 Drawing Sheets

OTHER PUBLICATIONS

Shewchuk, "Adaptive Precision Floating-Point Arithmetic and Fast Robust Geometric Predicates", retrieved on Oct. 1, 2008 at <<http://rioja.sangria.cs.cmu.edu/tumble/papers/robust-arithmetic.pdf>>, May 17, 1996, pp. i-ii and 1-53.

* cited by examiner

ARBITRARY PRECISION FLOATING NUMBER PROCESSING

BACKGROUND

Despite a continual increase in processing speed and memory (storage capacity) of computing devices, efficient use of computing resources (e.g., processors, memory, etc.) remains an important consideration when creating computing instructions and performing computing operations. Although excess computer memory may be available, it may be advantageous to minimize memory usage during certain operations to conserve resources and reduce unnecessary memory use that may quickly propagate during computing operations.

One type of computing operation which may use large amounts of memory includes mathematical operations involving large numbers. Large numbers may be any type of number (e.g., real, whole, integers, imaginary, complex, polar, etc.) that include a high number of significant digits (e.g., greater than ten digits). One example of a large number is PI ($\pi$), which includes an infinite quantity of digits beyond the decimal place. As such, PI may be expressed with different levels of precision, such as 3.1415926535, which includes a significand (i.e., the "mantissa" as commonly used in the context of computer science) of eleven digits.

Many computing systems that perform mathematical operations save memory and increase processing throughput by truncating large numbers, thus compromising accuracy in exchange for reduced memory allocation and faster processing. However, in some disciplines, a reduction of accuracy from truncating numbers may not be acceptable. For example, in academics and professional use, such as in the aerospace industry where very precise calculations are necessary, large numbers may need to be maintained and manipulated without excessive truncation or loss of significant digits.

SUMMARY

Exemplary techniques for providing arbitrary precision floating number (APFN) processing are disclosed. An APFN store may be used to store a large number (i.e., the APFN) having many significant digits, which in turn may enable a high degree of precision in mathematical operations.

According to one or more embodiments, an APFN module may be used to create and/or define the APFN store. The APFN module may enable a user to define a precision (significant digits) for the large number that corresponds to the size of an array of bytes in the APFN store that are allocated for storing the large number.

In various embodiments, the APFN store may be used to store additional intermediary data and a resultant of the mathematical operation(s). For example, a resultant of a mathematical operation may be stored in the APFN store despite including more or fewer significant digits than an input of the mathematical operation.

In some embodiments, the APFN store may enable more efficient processing of the mathematical operation by optimizing memory storage and management. As such, the APFN store may reduce data access time when performing calculations.

This summary is provided to introduce simplified concepts of arbitrary precision floating number (APFN) processing, which is further described below in the Detailed Description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference number in different figures refers to similar or identical items.

DETAILED DESCRIPTION

Overview

Figure 1:
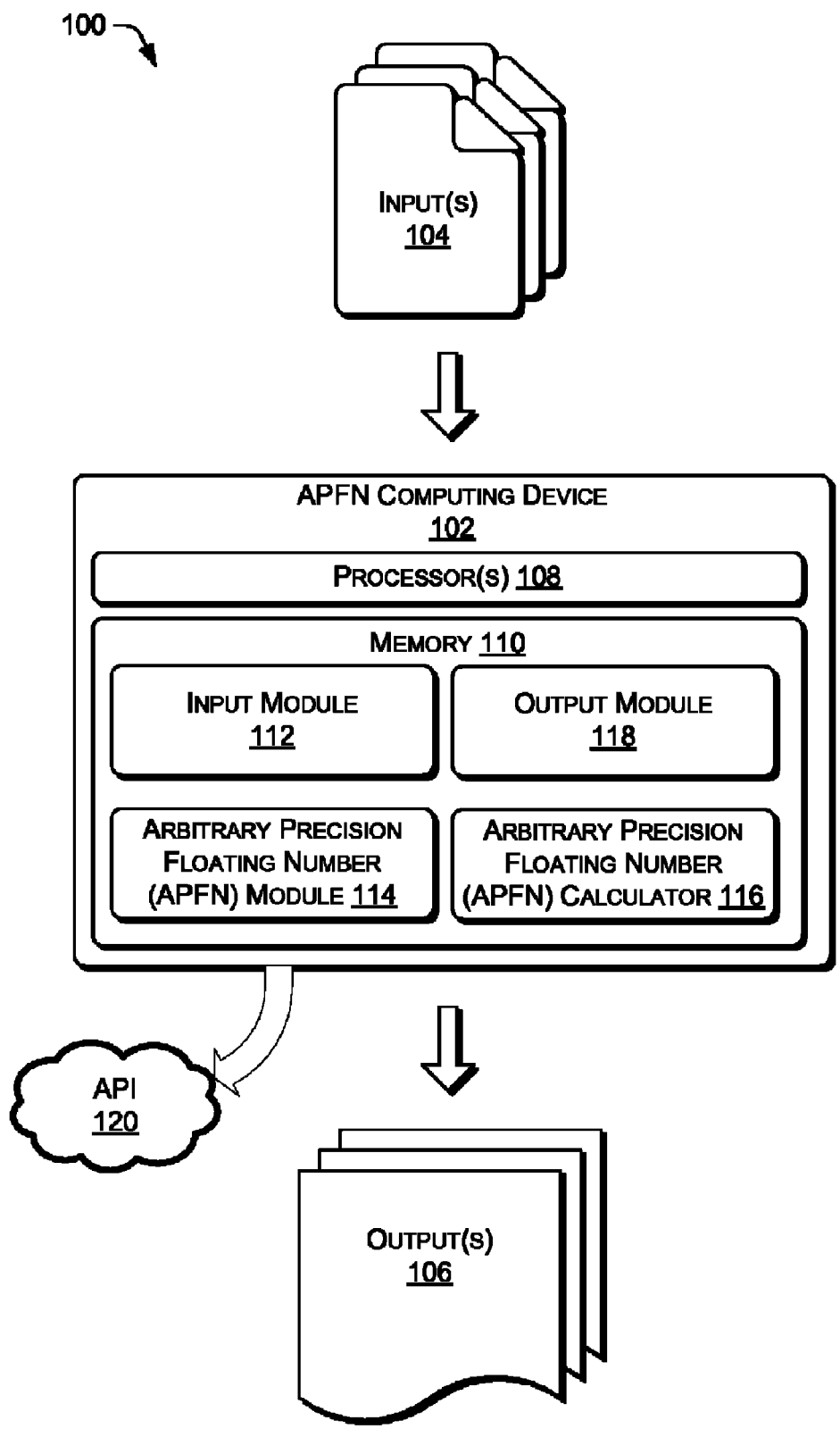
FIG. 1 is a block diagram of an illustrative computing environment that may be used to implement one or more embodiments of the arbitrary precision floating number processing.

As discussed above, it may be important to store and process large numbers without truncating the number and compromising the accuracy of a calculation. For example, an engineer may desire to perform a calculation with PI ($\pi$) carried out to 20 digits after the decimal (significand of 21 digits which includes the lead digit of "3"), which may provide a result that includes a similar number of significant digits.

In high precision calculations, a user (e.g., person performing calculations) often knows, or can figure out, how much precision is necessary in a definition of a number to carry out the calculation within a predetermined error threshold. The precision may correlate with the number of significant digits that are desired in a calculation. In various embodiments, the user may define a precision before creating a storage definition for a number. The precision, as used herein, is the size of the internal array of bytes, which may be used to represent the significand. This definition may be particularly useful for numbers written in scientific notation (e.g., $1.23 \times 10^6$, which is equivalent to 1,230,000). The number may be selected from a group containing all real numbers.

The desired level of precision correlates with the number of bytes used to store the number. Thus, a number with a large precision (e.g., having 100 digits) will require more bytes for storage than a smaller number (e.g. having 25 digits), which still includes relatively high precision. As discussed herein, the size of a number refers to the size of the internal array of bytes necessary to store the number (correlating to the number of significant digits that are in the number) rather than to the actual value of the number. For example, a first number equal to 3.141592 is a larger number than a second number equal to 1234 for the purposes of this disclosure because the first number has a precision equal to seven whereas the second number has only a precision equal to four. Therefore, a dynamically defined data structure for the first number will likely be larger than a defined data structure for the second number based on the size of the internal array of bytes necessary to store the numbers. Many large numbers exist, some of which are irrational and do not terminate at a fixed point to the right of the decimal place. Irrational numbers include numbers such as PI, √2, and Euler's number (e). Other large numbers may include, without limitation, Log 2, Sin (E), Cos (E), and Tan (E).

Current systems often initialize an array of bytes with a predetermined precision value (e.g., 8 digits, 16 digits, etc). A precision value that is set too low may result in a data structure that truncates digits while the precision value that is set too high may result in memory that is needlessly allocated to storing superfluous information. However, user selection and/or dynamic modification of the precision of a data structure may create a harmonious balance between conserving memory and avoiding undesirable truncation of digits.

In one particular embodiment, the programming language C# (pronounced "C-Sharp") may be used to implement the arbitrary precision floating number (APFN) process as disclosed herein. The precision may be stored in an unsigned integer (uint), which includes all the information necessary to store and manipulate a large number.

Illustrative System

FIG. 1 shows a system 100 illustrating exemplary components of an arbitrary precision floating number (APFN) computing device 102. The APFN computing device may be configured to accept input(s) 104 for processing, manipulation, etc., and generate output(s) 106 as desired by a user of the computing device.

The input(s) 104 may include definitions for an initial data structure for storing large numbers having high precision. For example, the inputs(s) 104 may define precision value, a size of the significand of a large number and/or the size of the exponent of the large number. Other factors such as the sign of the number (positive/negative) or other characteristics (not-a-number, infinity, etc.) may be included in the input(s) 104. In addition, the input(s) 104 may include the large number once the data structure is initialized by the APFN computing device 102.

As described above, the APFN computing device 102 may process, manipulate, etc., the input(s) to generate output(s) 106 as desired by a user of the computing device. In some embodiments, the output(s) 106 include a large number that is a result of a mathematical operation involving the large number included in the input(s) 104. The output(s) 106 may use the initial data structure or a modified data structure that conforms to requirements of the output. For example, if a large number is input to the computing device to cause a generation of resultant large number, the output may include a modified data structure.

The APFN computing device 102 may include one or more processors 108 and a memory 110. The memory 110 may include volatile and/or nonvolatile memory, removable and non-removable media implemented in any method or technology for storage of information, such as computer-readable instructions, data structures, program modules or other data. Such memory may include, but is not limited to, random access memory (RAM), read-only memory (ROM), Electrically erasable programmable read-only Memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 110 of the APFN computing device 102 may store a number of components such as an input module 112, an APFN module 114, an APFN calculator 116, and an output module 118, among other possible components.

The input module 112 may be configured to receive the input(s) 104 into the APFN computing device 102. For example, without limitation, the input module 112 may include a user interface that enables a user to selectively provide at least one precision value (e.g., size of the significand or exponent) and a large number, which may be received by the input module 112 and stored for further processing.

The APFN module 114 may use the input(s) 104 to dynamically create a data structure appropriate to store the large number. In some embodiments, the APFN module 114 may first determine a precision value from the input(s) 104, and then initialize a data structure for the given precision. The initialized data structure may then be used to store the large number as provided by the input(s) 104.

The APFN calculator 116 may enable the user to perform various mathematical operations using the large number stored in the data structure created by the APFN module 114. The mathematical operations may include addition, subtraction, multiplication, division, exponentiation, log functions, trigonometry functions, geometry functions, or other related mathematical operations and variants (e.g., inverse functions, etc.).

The APFN calculator 116 may perform calculations more efficiently than conventional calculators because the APFN calculator performs calculations on large numbers that use economical data structures. As such, the APFN calculator 116 may not waste time searching unused bytes because memory usage may be optimized per the input(s) 104, thus increasing computation processing by the APFN calculator.

In some embodiments, the APFN calculator 116 may produce a resultant large number that requires another data structure to store the initial large number, thus requiring additional processing by the APFN module 114. For example, when performing exponentiation of a large number, the resultant may require even more bytes to store a desired level of precision without producing an overflow or casting out extra bytes resulting in a loss of precision (e.g., truncation). In other embodiments, the resultant may be stored in the same data structure as the initial large number. In some instances, the data structure may be dynamically modified (adjusted) to accommodate storage of the resultant without lost of precision (e.g., significant digits).

Finally, the output module 118 may present the resultant to another mechanism. For example, the output module 118 may enable the APFN computing device 102 to provide an APFN library, such as via an application program interface (API) 120, which may receive the input(s) 104 and pass through the output(s) 106 from the output module 118. In other embodiments, the output module 118 may output a resultant of a mathematical operation of a large number, which is performed by specialized software for professional, academic, or other advanced users.

Illustrative Operations

Figure 2:
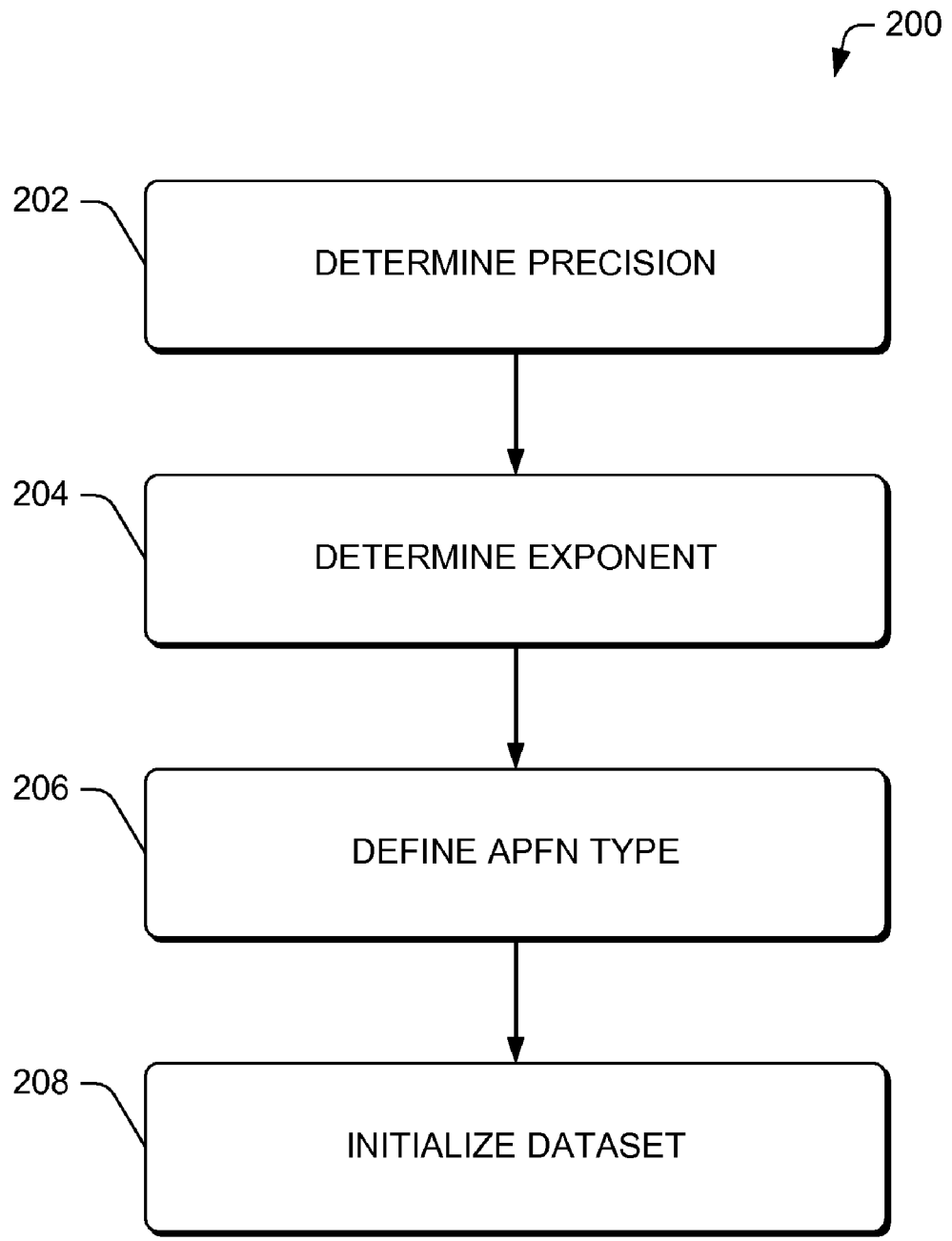
FIG. 2 shows a flow diagram of an illustrative process of collecting one or more inputs to store an APFN (large number) in an APFN store having an initialized array of bytes in accordance with some embodiments of the disclosure.

FIG. 2 shows an illustrative process 200 of collecting one or more inputs to store an APFN (large number) in an APFN store having an initialized array of bytes in accordance with some embodiments of the disclosure. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

In accordance with one or more embodiments, the array of bytes may require inputs prior to initialization and storage of a large number. The inputs may include a precision (e.g., size of significand), an exponent, and an APRN type, among other possible inputs. Hence, as shown in FIG. 2, the process generally determines a precision at 202, determines an exponent at 204, and defines an APRN type at 206.

In one implementation, the APFN module 114 may enable a user to define a size of the APFN store for storing, processing, or otherwise manipulating the APFN with a user-determined precision. For example, if the user desires to store the number PI ($\pi$) to ten digits after the decimal place, then the significand (quantity of digits) would be equal to eleven (e.g., 3.1415926535 has one digit to the left of the decimal and ten digits to the right of the decimal which equals eleven digits). In this example, the precision is the significand. In a base 32 system ($2^{32}$), the number PI (disregarding the decimal place) would require a size of two because the eleven digit number would be stored as a first number using $2^{(32)(1)}$ in addition to a second number being stored using $2^{(32)(0)}$.

In some embodiments, at 204, the APFN module 114 may enable the user to optionally define an exponent of the APFN store that is different than a base $2^{32}$. In other embodiments, the exponent may be predetermined, such as with a set number (e.g., base $2^{32}$, $2^{16}$, etc.) or with a base that corresponds to the system used for performing operations (e.g., 32-bit system would have a base of $2^{32}$). In contrast, current systems rely on a base 10 system for storing numbers, which requires truncation of significant digits, such that PI would is truncated to 3.141592654 without the possibility of more significant digits even when the user desires greater precision.

At 206, the APFN module 114 may enable the user to define an APFN type for the APFN store. The APFN type may be the sign of a number (positive/negative) or other types of numbers or non-numbers that occur in mathematics. For example, the APFN store may include a tag for identifying whether a number is positive, negative, positive infinity, negative infinity, not-a-number (NaN), positive NaN, or negative NaN.

In some embodiments, the array of bytes may be formulated using the inputs discussed above as follows:

$$n \approx \text{sign}(n) \times t \times (2^{32})^{exponent} \quad \text{Equation (1)}$$

where n is the array of bytes format, sign(n) is the APFN type, t is defined as follows:

$$t = \text{data}[size-1]*2^{32*(-1)} + \text{data}[size-2]* \\ 2^{32*(-2)} + \ldots + \text{data}[0]*2^{32*(-size)} \quad \text{Equation (2)}$$

In Equation 2, the size is provided at the operation 202. In additional embodiments, the exponent size may be included in the size definition. An associated error for the size definition may be calculated as follows:

$$\text{Error} = (2^{32*(exponent-size)}) \quad \text{Equation (3)}$$

In some embodiments, the array of bytes format may be used for storing temporary computing data (intermediate data) and/or the resultant of a mathematical operation in addition to the initial large number. Thus, a relatively large array of bytes may be selected when initializing the array of bytes. Alternatively or additionally, the array of bytes may be dynamically updated during runtime to adjust the precision of data stored in the array. In some embodiments, when the APFN store is not large enough to store the APFN and other data (e.g., the resultant, intermediate data, etc.), a new APFN store may be created having a larger storage than the prior APFN store to accommodate storing the APFN and the other data. Similarly, a smaller APFN store may be created when it is desirable to decrease the size of the APFN store.

As discussed above, the APFN type may be defined to create an enumeration as follows in Table 1.

TABLE 1

APFN Type

| | |
|---|---|
| 1 | private enum APFNType : short |
| 2 | { |
| 3 | NegativeInfinity = −2, |
| 4 | Negative = −1, |
| 5 | Positive = 1, |
| 6 | PositiveInfinity = 2, |
| 7 | } |

The array of bytes may be defined by the APFN module 114 as follows in Table 2.

TABLE 2

APFN Structure

| | |
|---|---|
| 1 | struct APFN |
| 2 | { |
| 3 | private uint[ ] data; // data |
| 4 | private int size; // how many entries used in number |
| 5 | private int exponent; // exponent of $2^{32}$ system |
| 6 | private APFNType type; |
| 7 | } | where the length of the data array is not less than the size. On a 32 bit system, the largest addressable unsigned integer is $2^{32}$. Thus by making $2^{32}$ the base of exponents stored in the APFN store, the size of the number is maximized that may be represented by APFN (large number).

At 208, the APFN module 114 may initialize the array of bytes. As such, the APFN module 114 operates in a two step process. First, the inputs 104 are received by the input module 112, which are used to formulate the array of bytes. Second, the APFN module 114 initializes the array of bytes to enable input of the large number.

An illustrative initialization process is provided below in Table 3.

TABLE 3

APFN Creation

| | |
|---|---|
| 1 | APFN y = new APFN(256); |
| 2 | APFN.SetValue(ref y, 3.1415926); |

Alternatively, a simple wrapper class named APFNCreator may be provided, which enables the same result as the code in Table 3 by the following code in Table 4.

TABLE 4

APFNCreator

| | |
|---|---|
| 1 | APFN y = APFNCreator.Create(256, 3.1415926) |

In still further embodiments, the array of bytes may be defined using a variable divisor to allocate a portion of the available bytes to the number size (e.g., significand) and the remaining portion of the available bytes to the exponent size. For example, a bit size may be defined as 128 bytes, where the variable divisor may be set to 96 bytes, thus leaving 32 bytes to store the exponent size, although large numbers would likely require more bytes of data than provided in this simplified example).

In accordance with various embodiments, the APFN module 114 may be implemented as an application program interface (API) (e.g., API 120 in FIG. 1) to enable extensive use of large numbers in various applications and involving a spectrum of mathematical operations. For example, the API may enable a user to define an APFN object via an initialization and construction process, which then may be used in various platforms. When initializing an array of bytes, the APFN object created by the API may be extendable to support mathematical operations that involve large numbers. As described above, the APFN object may be used in mathematical calculations involving large numbers with large quantities of significant digits, for example in the order up to $2^{32}$, and the APFN object may be used to store complex numbers, polar numbers, imaginary numbers, and the like. The APFN objects may be used in applications that include, but are not limited to, many scientific applications including weather modeling, thermodynamics modeling, Fourier analysis, and the like. Further, using an API, the APFN object may be able to support inheritance, polymorphism, method-overloading, templates, and so forth.

To further explain advantages of the disclosure, a detailed comparison is presented to explain the storage of a number using the APFN store as compared to current processes which truncate significant digits. This comparison is presented immediately below.

An APFN store consists of a data array of uints ("data"), a size, an exponent, and an APFNType. The data array length, called a precision, is set during runtime by a creator function called APFNCreator. The size is a uint that stores the number of data array slots actually used. The exponent stores the maximum exponent used by the number using base $2^{32}$. Note that a uint "digit" stored as a space in the data array, can store a value from 0 through $2^{32}$, thus motivating the base of $2^{32}$. The APFType is an enumerated type that sets flags indicating the sign of the number, whether or not the number is infinity, or the like.

Example of APFN

An example of using the APFN store is as follows: Say that a user wishes to represent PI out to 11 significant digits, i.e. a small number that requires a large precision. This would be represented in base 10 as:

3.1415926535.

Note that if the decimal point is eliminated in 3.1415926535, the result is 31415926535.

This number is represented in binary as:

0111 0101 0000 1000 1000 1111 1111 0000 0111

Truncating the first 0 results in:
111 0101 0000 1000 1000 1111 1111 0000 0111
This is a resulting large number that requires 35 bits to represent.

It is desirable to represent this large number as an APFN using the APFN store, which uses base $2^{32}$ and because 32 (size of one uint) <35 <64 (size of 2 uints). This requires allocation of at least 2 uints in a data array. In other words, the precision is equal to two (precision=2).

When allocating the 2 uints in the data array, they may be stored as data[1] and data[0].

Data[1]=0000 0000 0000 0000 0000 0000 0000 0011

Data[0]=0101 0100 0110 0101 0101 0011 0000 0111

Size=2 (i.e., there are 2 uints in the data array).

$$3.1415926535 \text{ in APFN} = \text{data}[1]*(2^{32})^0 + \text{data}[0]*(2^{32})^{-1} \quad \text{Equation (4)}$$

(I.e., the max $2^{32}$ exponent is 0)

APFNType=1 (the enum for a positive number).

In APFN data type declaration there is internal data (e.g., _data, _size, and _exponent). In an example using $1.0*2^{-33}$, and $1.0*2^{33}$, the _data from _size 1 to 0 contain the actual APFN digits. Next, the _exponent indicates the decimal point is placed between _data[_size 1-_exponent] and _data[size 2-_exponent]. Therefore, an APFN is defined as shown in Equation 5, below.

$$APFN = \_data[\_size - 1] * (2^{32})^{(\_size-2-\_exponent)} + \ldots + \_data[\_size - 1 - \_exponent] * (2^{32})^0 + \_data[\_size - 2 - \_exponent] * (2^{32})^{-1} + \ldots + \_data[0] * (2^{32})^{(-1-\_exponent)} \quad \text{Equation (5)}$$

Table 5 shows a comparison between storage of the example numbers used above as $1.0*2^{-33}$, and $1.0*2^{33}$. Note that the benefits of the APFN store is no loss of precision.

TABLE 5

| IEEE 754 | Binary | APFN._data | APFN._size | APFN._exponent |
|---|---|---|---|---|
| $1.0 * 2^{-33}$ | 0.00, ..., 01 | _data[2] = 0<br>_data[1] = 0<br>_data[0] = 1 | 3 | 0 |
| $1.0 * 2^{33}$ | 10, ..., 00.0 | _data[2] = 1<br>_data[1] = 0<br>_data[0] = 0 | 3 | 1 |

In the above example, all 11 decimal digits of precision were preserved and stored. Contrast this with IEEE 754-1985, a floating point standard used in the C programming language, where a float is stored as 32 bits where the sign is 1 bit, the exponent Is 8 bits, and the significand is 23 bits.

Again 3.1415926535 is represented here with 11 significant digits.

It is a positive number such that: Sign=1.

Because PI is expressed as a value between 1<PI<10, the exponent=0 (i.e. the one's place). Exponent=0.

The full binary expansion of 3.1415926535 in binary is:

111 0101 0000 1000 1000 1111 1111 0000 0111 (i.e., 35 bits)

But since there are only have 23 bits to work with, the rest are truncated. The right most digits are then truncated so they fit into 23 bits i.e. a number less than 8388607. To get PI to fit, the left four digits are truncated resulting in 3141592. (3141592<8388607).

In binary format, the significand (3141592) is:

0010 1111 1110 1111 1101 1000

So to get 3.1415926535 to fit in 32 bits per IEEE, 4 digits of precision are lost.

Illustrative Mathematical Operations Using APFN

Figure 3:
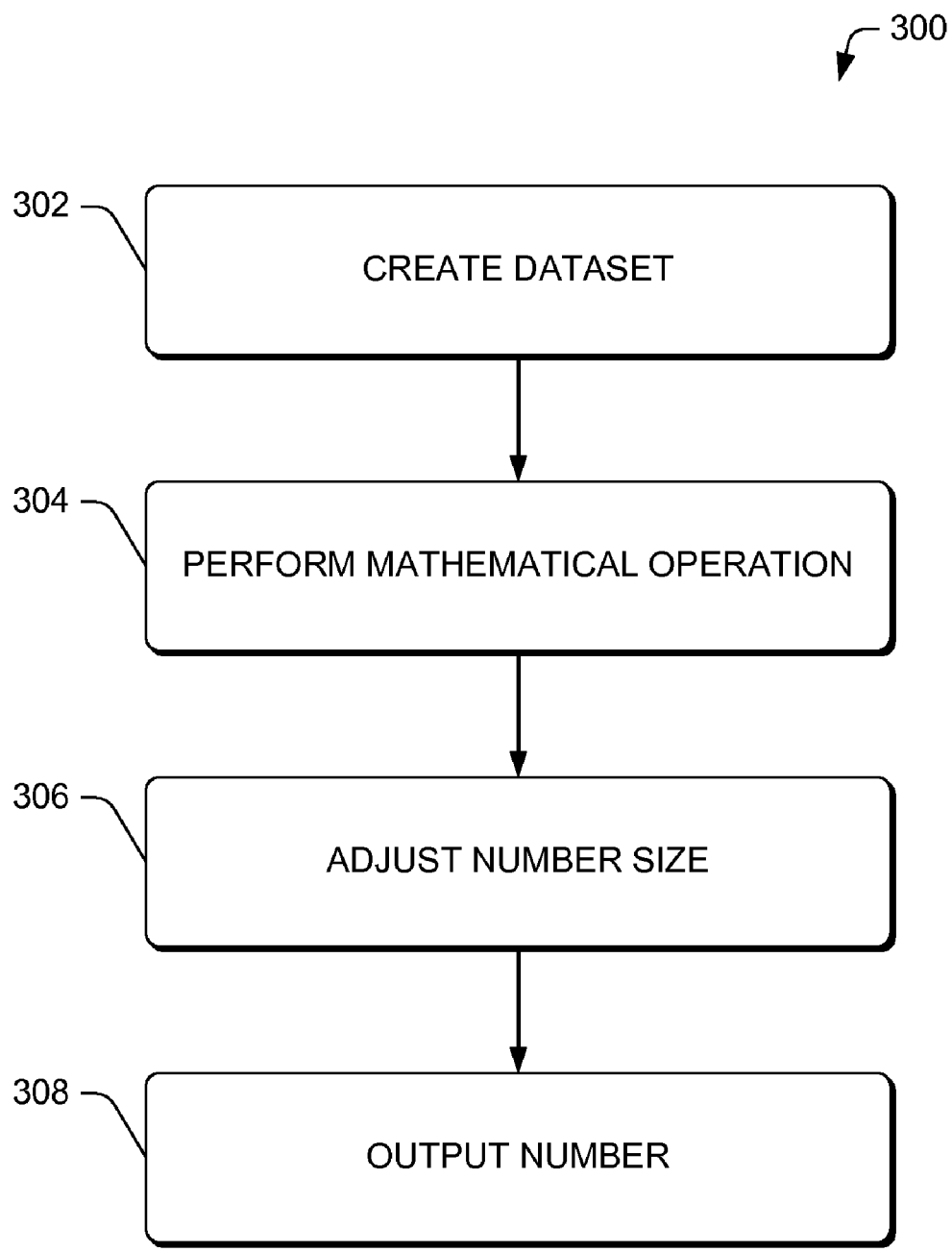
FIG. 3 shows a flow diagram of an illustrative process of performing mathematical operations using the APFN and dynamically adjusting the APFN store definitions in accordance with some embodiments of the disclosure.

FIG. 3 shows a flow diagram of an illustrative process 300 of performing mathematical operations using the APFN and dynamically adjusting the APFN store definitions in accordance with some embodiments of the disclosure. At 302, an array of bytes is created as described above with reference to process 200.

At 304, mathematical operations may be performed using the large numbers while retaining a desired level of precision (e.g., significant digits, etc). The APFN calculator 116 may receive the large number from the APFN module 114, for processing of mathematical operations such as addition, subtraction, multiplication, division, exponentiation, log functions, trigonometry functions, geometry functions, or other related mathematical operations and variants (e.g., inverse functions, etc.).

An illustrative addition calculation may be expressed as pseudocode as shown below in Table 6.

TABLE 6

| Function Add |
| --- |
| 1   public static void Add(ref APNumber sum, APNumber augend, APNumber |
| 2        addend) |
| 3   If sign(augend) !=sign(addend), use Subtract function and return |
| 4        augend substract (−addend). |
| 5   Set sum.type = augend.type, sum.exponent = augend.exponent . |
| 6   If augend.exponent < addend.exponent, exchange augend   with addend. |
| 7   Check augend and addend's zero point position and bytes count, and |
| 8        consider the bytes count of sum.   Conduct the process accordingly for |
| 9        each case. |
| 10  Adjust the sum.exponent and sum.exponent to handle carryover bit cases |
| 11       to maintain desired precision. |
| 12  Cast out any extra bytes of the sum. |

An illustrative subtraction calculation may be expressed as pseudocode as shown below in Table 7:

TABLE 7

| Function Subtract |
| --- |
| 1   public static void Subtract(ref APNumber diff, APNumber minuend, |
| 2        APNumber subtrahend) |
| 3   If sign(minuend) !=sign(subtrahend), use Add function and return |
| 4        minuendadd (−subtrahend). |
| 5   If minuend.exponent < subtrahend.exponent, exchange minuend with |
| 6        subtrahend. |
| 7   Deal with the special cases: minuend.exponent == subtrahend.exponent |
| 8        and minuend.exponent == subtrahend.exponent+1 |
| 9   Check minuend and subtrahend's zero point position and bytes count, and |
| 10       consider the bytes count of the difference. Conduct the process |
| 11       accordingly for each case. |
| 12  Adjust the diff.exponent and diff.exponent to handle carryover bit |
| 13       cases to maintain desired precision. |
| 14  Cast out any extra bytes from the difference. |

An illustrative multiplication calculation may be expressed as pseudocode as shown below in Table 8:

TABLE 8

| Function Multiply |
| --- |
| 1   public static void Multiply(ref APNumber product, APNumber |
| 2        multiplicand, APNumber multiplier) |
| 3   Based on the sign of multiplicand and multiplier, decide on the sign of |
| 4        product (APFN Type). |
| 5   Set product.exponent = multiplicand.exponent + multiplier.exponent; |
| 6   Multiply multiplicand.data and multiplier.data. |

TABLE 8-continued

| Function Multiply |
| --- |
| 7   Adjust the product.size to handle carryover bit cases to maintain desired |
| 8        precision. |
| 9   Cast out any extra bytes from the product. |

An illustrative division calculation may be expressed as pseudocode as shown below in Table 9:

TABLE 9

| Function Divide |
| --- |
| 1   public static void Divide(ref APNumber quotient, APNumber dividend, |
| 2        APNumber divisor) |
| 3   Based on the sign of dividend and divisor, determine the sign of |
| 4        quotient. |
| 5   Set quotient.exponent = dividend.exponent − divisor.exponent + 1; |
| 6   Divide multiplicand.data and multiplier.data. |
| 7   Adjust the quotient.size and quotient.exponent to handle carryover bit |
| 8        cases to maintain desired precision. |
| 9   Cast out any extra bytes from the quotient. |

As shown above, the mathematical operations may manage the array of bytes to optimize data storage and/or remove unnecessary data storage. Carryover bit cases may result when the resultant includes more significant digits and thus may require a dynamically extended array for storing the resultant large number. When the resultant includes fewer significant digits, and thus less data storage than the existing array of bytes provides, the extra bytes may be removed from the resultant.

One distinct advantage of the mathematical operations, as disclosed herein, is reduced calculation time which results in increase efficiency of resources (e.g., computing device processor, memory, etc.) and a reduction in related costs. For example, when many calculations are included in a string of operations, substantial savings in time may occur by implementing the mathematical operations disclosed herein. As compared to GMP (GNU Multiple-Precision Library), a currently widely used precision calculation library, processing time for addition, subtraction, and multiplication were reduced by over fifty percent, while the division operation showed a modest reduction in processing time.

In some programming languages, such as C#, a garbage collection process may be used to remove dedicated storage bit when the bytes remain unused for a period of time. In some embodiments, memory usage may be more effectively used by storing the resultant in an array of bytes which is defined for a large number. For example, during a calculation of a+b, the sum (ref a) may be stored in the existing array of bytes and thus no additional memory may be used in the mathematical operation. In other embodiments, the resultant may be stored to other available large number array of bytes, such as using t in Equation 2 as Add(ref t, a, b).

During an arbitrary precision floating number calculation, it may be desirable to pass the result precision to a function, such as during an API call to an APFN module (function). It may be unnecessary to input the precision as a coefficient in every function because the precision may be obtained from the length of current number's unit data array length. Instead, only the APFN's precision in initialization needs to be defined, and during a mathematical calculation, only the variable name may be provided.

CONCLUSION

The above-described techniques pertain to arbitrary precision floating number processing. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method to dynamically allocate memory to an arbitrary precision floating number (APFN) that is a real number to undergo a mathematical field operation without loss of precision, the method comprising:
   declaring an array of bytes to store at least a portion of the APFN in an APFN store, where a byte or a subdivision of bytes in the APFN store represents a digit of the APFN;
   declaring a size variable to store a quantity of bytes allocated to the array of bytes in the APFN store; and
   dynamically allocating the quantity of bytes in the APFN store during runtime to represent an APFN in the array of bytes.

2. The method of claim 1, wherein the portion of the APFN store represented in the array of bytes defines a significand.

3. The method of claim 1, wherein the portion of the APFN store represented in the array of bytes defines an exponent.

4. The method of claim 2, wherein declaring a variable to enumerate an APFN type of the real number includes at least one of positive, negative, positive infinity, negative infinity, not a number ("NaN"), positive not a number, or negative not a number.

5. The method of claim 1, wherein the size variable to store a quantity of bytes allocated to the array of bytes without loss of precision maintains significant digits of the real number in the APFN store.

6. The method of claim 5, further comprising:
   performing the mathematical operation with the real number stored in the APFN store;
   allocating the quantity of bytes in the array of bytes during runtime to store the significant digits without loss of precision in the event the mathematical operation creates a result where the result has more significant digits than currently allocated to the APFN.

7. The method of claim 6, wherein the mathematical operation is at least one of addition, subtraction, multiplication, division, or exponentiation; and the resultant is at least one of a sum, a difference, a product, a quotient, or a result, respectively.

8. The method of claim 6, wherein the mathematical operation is division and the resultant is a quotient, and when a quotient is undefined, updating the APFN type during runtime to indicate at least one of positive infinity and negative infinity.

9. The method of claim 1, wherein the declared array of bytes to store at least a portion of the APFN has a base of at least $2^x$, where x is the number of bits used in the system.

10. The method of claim 1, wherein the declared array of bytes to store at least a portion of the APFN has a base of $2^{32}$.

11. An application program interface for an arbitrary precision floating number (APFN) computing system, the application program interface being embodied on a computer-readable medium and having processes for performing the following functions:
   receiving a precision value to allocate an array of bytes to store a large number having a user determined number of significant digits;
   constructing the array of bytes using the received precision value; and
   initializing the array of bytes to receive the large number, the initialized array of bytes being extendable to support mathematical operations involving the large number.

12. The application program interface of claim 11, further comprising:
   executing a mathematical operation that includes the large number; and
   storing a resultant of the mathematical operation in the array of bytes.

13. The application program interface of claim 12, further comprising modifying the precision value of the array of bytes prior to storing the resultant.

14. The application program interface of claim 13, wherein modifying the precision value of the array of bytes includes expanding the array of bytes to accommodate carry over bytes from the mathematical operation.

15. The application program interface of claim 14, wherein the mathematical operation is at least one of addition, subtraction, multiplication, or division.

16. The application program interface of claim 12, further comprising removing additional bytes from the array of bytes to supplement a garbage collection process and remove memory resource restrictions in the array of bytes.

17. The application program interface of claim 12, wherein the mathematical operations involving large numbers includes at least one of complex numbers, polar numbers, and imaginary numbers.

18. One or more computer readable media comprising computer-executable instructions that, when executed by a computer, perform acts comprising:
   declaring an array of bytes to store an arbitrary precision floating number (APFN) as an APFN store, where one or more bytes represent a digit of the APFN;
   receiving a size variable for the APFN store to store the number of bytes allocated to the array of bytes;
   receiving an input to store as the APFN in the array of bytes in the APFN store; and
   storing a resultant of a mathematical operation in the APFN store with the APFN.

19. One or more computer readable media as in claim 18, wherein the APFN store can support at least one of inheritance, polymorphism, method-overloading, and templates.

20. One or more computer readable media as in claim 19, wherein receiving an input to store as the APFN includes receiving a resultant of a mathematical operations to store as the input.

* * * * *